United States Patent
Choi

(10) Patent No.: US 11,197,144 B2
(45) Date of Patent: Dec. 7, 2021

(54) PORTABLE ENERGY STORAGE SYSTEM FOR RESCUE SYSTEM

(71) Applicant: Enercamp Co., Ltd., Daegu (KR)

(72) Inventor: Jung Sub Choi, Daegu (KR)

(73) Assignee: Enercamp Co., Ltd., Daegu (KR)

( * ) Notice: Subject to any disclaimer, the term of this patent is extended or adjusted under 35 U.S.C. 154(b) by 0 days.

(21) Appl. No.: 16/931,820

(22) Filed: Jul. 17, 2020

(65) Prior Publication Data

US 2021/0195396 A1    Jun. 24, 2021

(30) Foreign Application Priority Data

Dec. 18, 2019 (KR) .................. 10-2019-0170239

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ............................... H04W 4/90; H04W 4/029
USPC ......................................................... 455/404
See application file for complete search history.

(56) References Cited

U.S. PATENT DOCUMENTS

| 2013/0030580 A1* | 1/2013 | Luke .................. H02J 7/0013 700/286 |
| 2013/0030920 A1* | 1/2013 | Wu ......................... B60L 1/02 705/14.64 |
| 2021/0050725 A1* | 2/2021 | Jensen ...................... H02J 3/32 |

FOREIGN PATENT DOCUMENTS

| KR | 20030075938 A | 9/2003 |
| KR | 20130143264 A | 12/2013 |
| KR | 20160033377 A | 3/2016 |
| KR | 20180082974 A | 7/2018 |
| KR | 101941261 B1 | 1/2019 |

OTHER PUBLICATIONS

Korean Office Action dated Oct. 29, 2020 in KR Application No. 10-2019-0170239.

\* cited by examiner

*Primary Examiner* — Ted M Wang
(74) *Attorney, Agent, or Firm* — Occhiuti & Rohlicek LLP

(57) ABSTRACT

Provided is a portable energy storage system (P-ESS) including a wireless communication module for forming a local wireless network. The P-ESS provides wireless communication between terminals within the local wireless network formed by the wireless communication module. In doing so, the terminals within the local wireless network are allowed to communicate with each other in an area or situation where communication is disabled, so that users of the terminals can check each other's safety or location.

9 Claims, 7 Drawing Sheets

Using your phone

PORTABLE ENERGY STORAGE SYSTEM FOR RESCUE SYSTEM

CLAIM FOR PRIORITY

This application claims priority to Korean Patent Application No. 10-2019-0170239 filed on Dec. 18, 2019 in the Korean Intellectual Property Office (KIPO), the entire contents of which are hereby incorporated by reference.

BACKGROUND OF THE DISCLOSURE

Field of the Disclosure

The present disclosure relates to a portable energy storage system (P-ESS) for a rescue system.

Related Art

Every year, emergency and natural disasters cause a lot of casualties and properties damages. In recent years, more and more areas across the world have been affected by extreme weather, earthquakes, and tsunamis, which are sometimes followed by large-scale power outages and communication disruptions. Accordingly, while preparing measures to predict emergency and natural disasters and minimize damages, it is also required to develop a technology for preparing for a situation in which it is difficult to make a rescue request or any contact due to damage to a communication network.

In addition, due to the increase in leisure time, the growth of the leisure industry, and increasing interest in camping, more and more people enjoy camping steadily. Accordingly, the likelihood of an accident occurring during camping or any of various leisure activities is also increasing. However, if an accident occurs during camping in an area with a poor communication network or in times of fishing or hiking in a remote area, it may be difficult to send a rescue request. If a rescue is not conducted quickly, additional damage may occur.

In addition, communication is often cut off in large national parks and the like. Since the communication network is not systematically established in mountain areas, it may not be easy to request a rescue in the event of an emergency. Therefore, a technology for preparing for such an emergency is required.

Related arts have been disclosed including Korean Patent Application Publication No. 10-2003-0075938 (Title: Alarm signal system and method using mobile communication network, Publication date: Sep. 26, 2003), Korean Patent Application Publication No. 10-2013-0143264 (Title: System and method for realtime emergency services, and storage medium recording program for implementing method thereof, Publication date: Dec. 31, 2013) Korean Patent Application Publication No. 10-2016-0033377 (Title: Apparatus and method for receiving relief signal and society safety network system using movable relief signal receiver, Publication date: Mar. 28, 2016).

However, since most of such rescue systems utilize a mobile communication network, they cannot be applied in an area where communication services are hardly available due to damage to the communication network or lack of facilities. Therefore, there is an urgent need to develop a technology for requesting a rescue in a situation in which communication is disabled, such as the event of an emergency/natural disaster or a camping area.

SUMMARY OF THE DISCLOSURE

The present disclosure has been proposed to solve the above problems of the previously proposed methods, and the present disclosure provides a rescue system utilizing a portable energy storage system (P-ESS) and wireless communication, the system in which a wireless communication module configured to form a local wireless network is installed in the P-ESS to provide wireless communication between terminals within the local wireless network, and thus, the terminals are allowed to communicate with each other in an area or situation where communication is disabled, thereby checking each user's safety or location.

Further, the present disclosure provides a rescue system utilizing a portable energy storage system (P-ESS) and wireless communication, the system which further includes a mobile terminal having an application program installed therein to monitor the P-ESS and the wireless communication module, so that it is possible to remotely control the P-ESS using the application program installed in the mobile terminal, to share information on a potential risk and prepare for an emergency or a natural disaster by transmitting a risk signal relating to a disaster or the like to terminals within a local wireless network.

According to an embodiment of the present disclosure, there is provided a portable energy storage system (P-ESS) including a wireless communication module configured to form a local wireless network, wherein the portable energy storage system is configured to provide wireless communication to terminals within the local wireless network formed by the wireless communication module.

Preferably, at least one selected from a group including a call service, a message service, a location information transmitting and receiving service, and a risk information transmitting and receiving service may be provided using wireless communication between terminals within the local wireless network formed by the wireless communication module.

Preferably, the wireless communication module may be configured to form the local wireless network when a predetermined condition is satisfied.

More preferably, the predetermined condition may be condition indicating restriction of a network use or a condition indicating an emergency.

Preferably, the local wireless network may include at least one selected from a group including Wi-Fi, Bluetooth, LTE, and GPS.

Preferably, an application program for monitoring the P-ESS and the wireless communication module may be installed in a mobile terminal.

More preferably, the mobile terminal may be configured to connect an Internet of Things (IoT) sensor through the local wireless network, and collect and analyze data collected by the IoT sensor.

More preferably, the mobile terminal may be configured to transmit a risk signal to a terminal within the local wireless network according to an analysis result.

According to the portable energy storage system proposed in the present disclosure, a wireless communication module for forming a local wireless network is installed in the portable energy storage system to provide wireless communication between the terminals within the local wireless network formed by the wireless communication module, so that the terminals within the local wireless network can communicate with each other in an area or situation where communication is disabled, thereby checking each user's safety and location.

In addition, according to the portable energy storage system in the present disclosure, since an application program for monitoring the portable energy storage system and the wireless communication module is installed in a mobile terminal, it is possible to remotely control the portable energy storage system using the application program installed in the mobile terminal and to share information on a potential risk or prepare for an emergency by transmitting a risk signal relating to an emergency or natural disaster to the terminals within the local wireless network.

DESCRIPTION OF EXEMPLARY EMBODIMENTS

Figure 1:
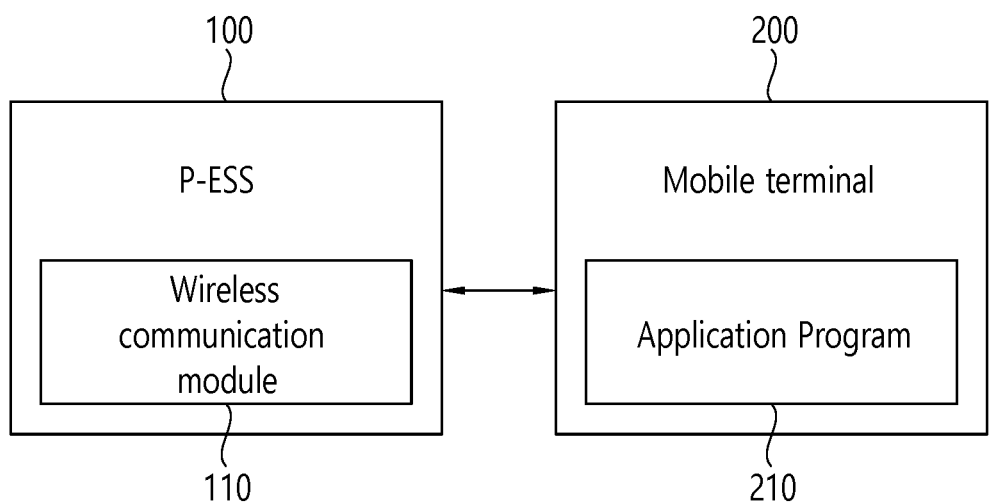
FIG. 1 is a diagram illustrating a configuration of a rescue system that utilizes a portable energy storage system (P-ESS) and wireless communication according to an embodiment of the present disclosure.

Various modifications and variations may be made to the present disclosure. Hereinafter, some particular embodiments will be described in detail with reference to the accompanying drawings.

However, it should be understood that the present disclosure is not limited to the embodiments and all the variations or replacements of the invention or their equivalents are included in the technical spirit and scope of the present disclosure.

The terms "first" and "second" may be used to describe various components, but the components are not limited thereto. These terms are used only to distinguish one component from another. For example, the first component may be also named the second component, and the second component may be similarly named the first component without departing from the scope of the present disclosure. The term "and/or" includes a combination of a plurality of related items as described herein or any one of the plurality of related items.

When a component is "connected" or "coupled" to another component, the component may be directly connected or coupled to the other component, but it should be understood that other components may be intervene. In contrast, when a component "is directly connected" or "coupled" to another component, no other components intervene.

The terms used herein are given to describe only the specific embodiments but not intended to limit the present disclosure. A singular term includes a plural term unless otherwise stated obviously. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms including technical or scientific terms as used herein have the same meanings as those generally understood by one of ordinary skill in the art. Such terms as generally defined in the dictionary should be interpreted as having meanings consistent with those understood in the context of the related technologies, and should not be construed as having excessively formal or ideal meanings unless clearly defined in the instant application.

Hereinafter, example embodiments of the present disclosure are described in detail with reference to accompanying drawings. To provide better understanding of the present disclosure, the same reference numeral is used to an identical element and descriptions are omitted for the identical element.

FIG. 1 is a view illustrating a configuration of a rescue system that utilizes a portable energy storage system (P-ESS) 100 and wireless communication according to an embodiment of the present disclosure. As shown in FIG. 1, the rescue system that utilizes the P-ESS 100 and wireless communication according to an embodiment of the present disclosure may include the P-ESS 100 and a wireless communication module 110 installed in the P-ESS 100, and may further include a mobile terminal 200 having an application program 210 installed therein to monitor the P-ESS 100 and the wireless communication module 110.

Hereinafter, each component constituting the rescue system utilizing the P-ESS 100 and wireless communication according to an embodiment of the present disclosure will be described in detail.

The P-ESS 100 is a miniaturized version of an energy storage system (ESS) which stores and manages energy so that energy can be efficiently used. The P-ESS 100 may store power and efficiently supply the power in times of need and may be compact and lightweight to be portable. The P-ESS 100 may stably provide power when an emergency or a natural disaster occurs or when it is difficult to use power, such as when camping. In particular, since the P-ESS 100 is compact and lightweight, the P-ESS 100 may be easily used even at home and may be kept in a vehicle to be used outdoors when needed. Recently, the P-ESS 100 has been made with dustproof and waterproof functions so that the P-ESS 100 can be used as an emergency item in the event of a possible emergency or natural disaster.

Figure 2:
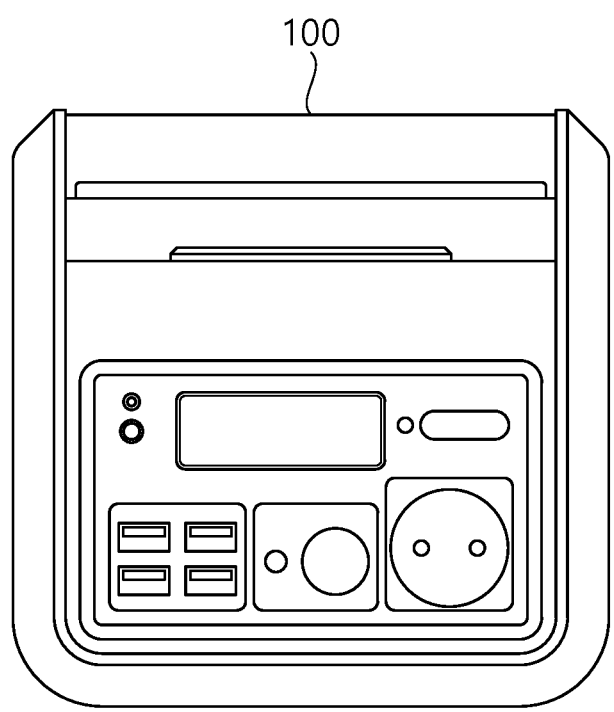
FIG. 2 is a diagram illustrating an example of a P-ESS included in a rescue system that utilizes the P-ESS and wireless communication according to an embodiment of the present disclosure.

FIG. 2 is a diagram illustrating an example of the P-ESS 100 included in the rescue system that utilizes the P-ESS 100 and wireless communication according to an embodiment of the present disclosure. As shown in FIG. 2, the P-ESS 100 according to an embodiment of the present disclosure and the P-ESS 100 of the rescue system utilizing wireless communication may include a handle to facilitate transport and may be carried by one person because the P-ESS 100 is lightweight. In addition, various types of outlets may be provided to supply power to various devices using the P-ESS 100, and a display device for checking a state of the P-ESS 100 may be included.

The wireless communication module 110 may be mounted in the P-ESS 100 and may form a local wireless network. That is, the wireless communication module 110 may be mounted inside the P-ESS 100 as illustrated in FIG. 2, so that a local wireless network can be formed by the wireless communication module 110. The wireless communication module 110 may be implemented in the form of a board that can be inserted into the P-ESS 100, and the P-ESS 100 may operate to apply power to the wireless communication module 110. The rescue system utilizing the P-ESS 100 and wireless communication according to an embodiment of the present disclosure may provide wireless communication between terminals within the local wireless network formed by the wireless communication module 110.

Here, the wireless communication module 110 may form the local wireless network when a predetermined condition is satisfied, and the predetermined condition may be a network use restriction or an emergency or natural disaster. For example, the wireless communication module 110 may form a local wireless network when the use of network is restricted as a user is out of a wireless internet or a wireless communication network, when the use of network is restricted as a base station or a communication network is damaged by an emergency or natural disaster, or the like. In order to determine whether a predetermined condition is satisfied, the wireless communication module 110 may receive a signal from the mobile terminal 200 which will be described in detail later.

At this time, the local wireless network may include at least one selected from a group including Wi-Fi, Bluetooth, LTE, and GPS. That is, the wireless communication module 110 may act as a kind of communication hub, so that various terminals within the local wireless network can exchange signals and data with each other.

More specifically, in a situation where a predetermined condition is satisfied, such as an environment where a call service, a message service such as SMS and MMS, a location information transmitting and receiving service, and an Internet service are all restricted, the rescue system utilizing the P-ESS 100 and wireless communication according to an embodiment may use wireless communication between terminals within the local wireless network formed by the wireless communication module 100 to provide at least one selected from a group including a call service, a message service, a location information transmitting and receiving service, and a risk information transmitting and receiving service.

Figure 3:
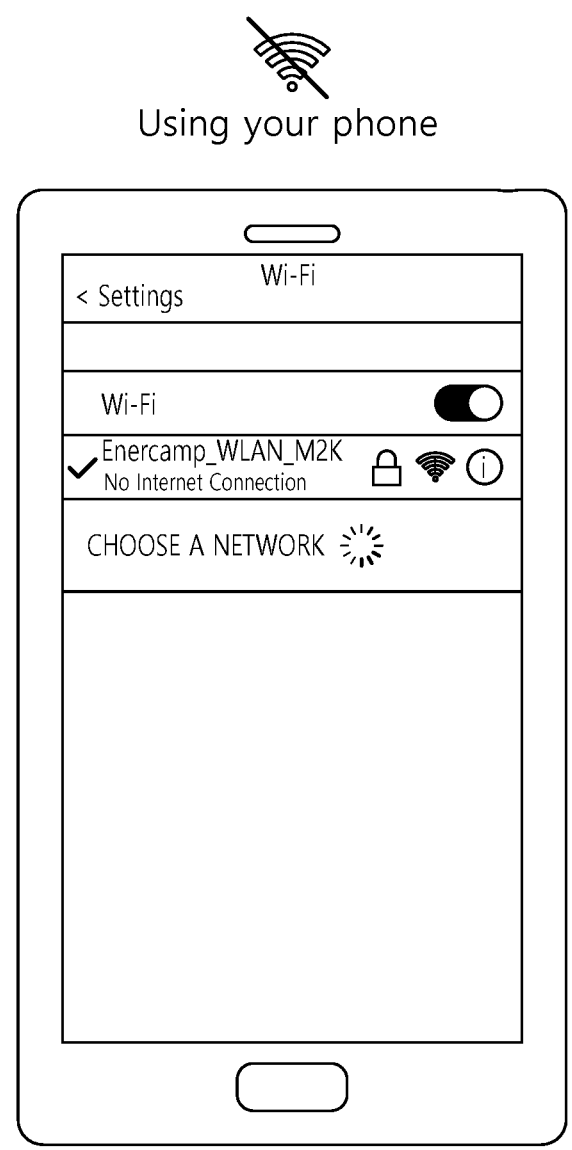
FIG. 3 is a diagram illustrating an example of a screen of a terminal within a local wireless network in a rescue system that utilizes a P-ESS and wireless communication according to an embodiment of the present disclosure.

FIG. 3 is a diagram illustrating an example of a screen of a terminal within a local wireless network in the rescue system that utilizes the P-ESS 100 and wireless communication according to an embodiment of the present disclosure. As shown in FIG. 3, once the wireless communication module 110 forms a local wireless network in the event of a network use restriction or an emergency or natural disaster, the terminal may exchange information with other terminal simply by selecting a network of the other terminal located within the formed local wireless network. In some implementations, the local wireless network may be automatically selected without an additional network selecting process.

Figure 4:
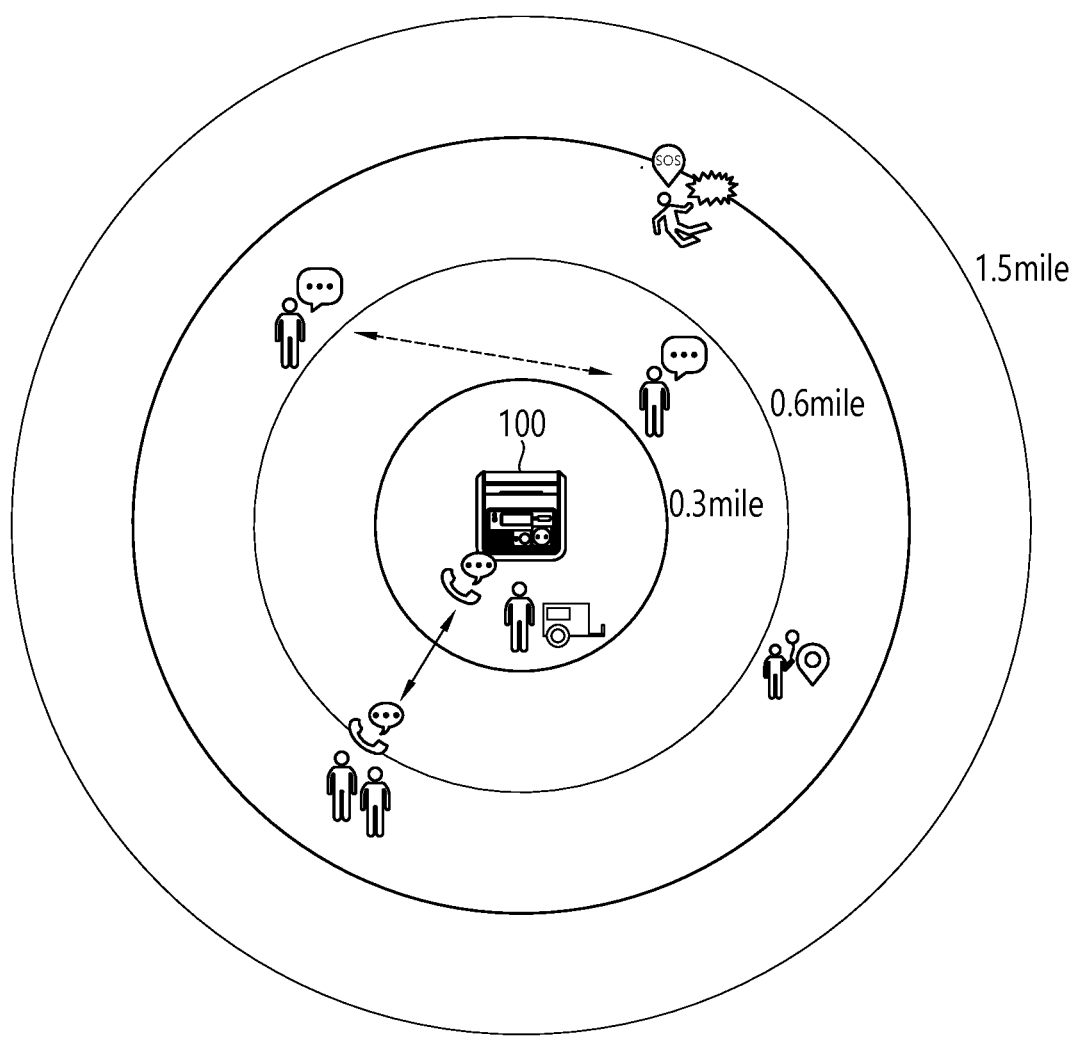
FIG. 4 is a diagram illustrating an example of wireless communication provided between terminals within a local wireless network in a rescue system that utilizes a P-ESS and wireless communication according to an embodiment of the present disclosure.

FIG. 4 is a diagram illustrating, for example, wireless communication provided between terminals within a local wireless network in a rescue system that utilizes a P-ESS 100 and wireless communication according to an embodiment of the present disclosure. As shown in FIG. 4, the wireless communication module 110 in the rescue system that utilizes the P-ESS 100 and wireless communication according to an embodiment of the present disclosure may form a local wireless network within a certain distance. For example, the local wireless network may be formed up to a radius of 1.5 miles from the P-ESS 100 having the wireless communication module 110 mounted therein.

Users within the local wireless network may access the local wireless network formed by the wireless communication module 110, as shown in FIG. 3, through terminals. The users may make calls, send and receive messages, send and receive location information, and send and receive risk information such as an SOS request, as shown in FIG. 4. For example, the terminal may transmit location information to a terminal of a firefighter who has entered the corresponding local wireless network area, thereby enabling a rapid rescue. In addition, in the event of an emergency or natural disaster, terminals within an area where the disaster has taken place may be used to make calls or exchange messages so that users can check each other's safety and share necessary information.

The mobile terminal 200 may install the application program 210 for monitoring the P-ESS 100 and the wireless communication module 110. Here, the application program 210 may be an application capable of checking a state of the P-ESS 100 and performing a remote control of the P-ESS 100.

In addition, the mobile terminal 200 may include a variety of smart device which is portable and allowed to have the application program 210 installed therein, for example smart phones, tablet PCs, smart watches, wearable devices, and the like. However, the mobile terminal 200 of the present disclosure is not limited to the types of the terminal as listed, and if a device is portable and allowed to have the application program 210 installed, the corresponding device may act as the mobile terminal 200 of the present disclosure.

Meanwhile, the mobile terminal 200 may connect an Internet of Things (IoT) sensor through the local wireless network and may collect and analyze data collected by the IoT sensor. That is, the mobile terminal 200 may access the IoT sensor within the local wireless network to collect sensing data. In addition, the portable terminal 200 may transmit a risk signal to a terminal within the local wireless network according to an analysis result.

For example, the mobile terminal 200 may collect real-time temperature data from a temperature sensor, and may analyze a temperature change. When the collected temperature data increases above a predetermined maximum threshold temperature or decreases below a predetermined minimum threshold temperature, heat stroke or hypothermia may occur, and thus, the portable terminal 200 may transmit a risk signal indicative of possible heat stroke or hypothermia to another terminal within the local wireless network. In addition, when a temperature variation is equal to or greater than a preset threshold, it may pose a threat to heath and thus the mobile terminal 200 may transmit a risk signal.

Figure 5:
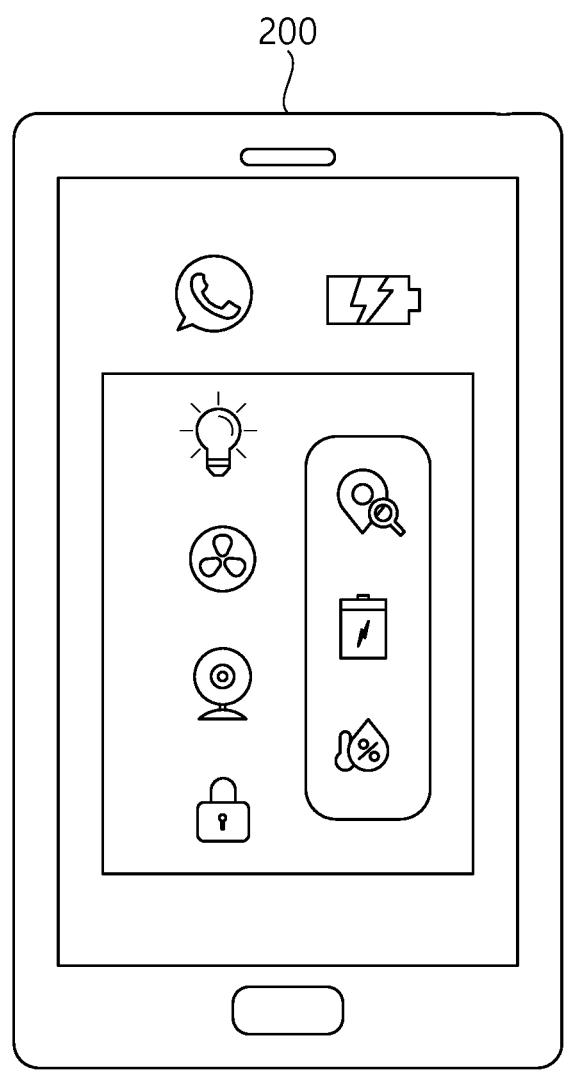
FIG. 5 is a diagram illustrating an example of a portable terminal in a rescue system that utilizes a P-ESS and wireless communication according to an embodiment of the present disclosure.

FIG. 5 is a diagram illustrating an example of the mobile terminal 200 in the rescue system that utilizes the P-ESS 100 and wireless communication according to an embodiment of the present disclosure. As shown in FIG. 5, in the rescue system that utilizes the P-ESS 100 and wireless communication according to an embodiment, a remote control may be performed by executing an application program installed in the mobile terminal 100 and transmitting a remote control signal to the P-ESS 100, and a local wireless network activation signal may be input by the wireless communication module 110. In addition, it is possible to monitor a charging state of power, a remaining amount of power, power consumption by category, and a state of the local wireless network formed by the wireless communication module 110. A user may check detailed information by selecting an icon as shown in FIG. 5. In addition, if a phone icon is selected, it is possible to make calls or transmit and receive messages with other terminals within the local wireless network, and if a thermometer-water drop icon is selected, it is possible to control connection to an IoT sensor and check sensing data collected by the connected IoT sensor.

Figure 6:
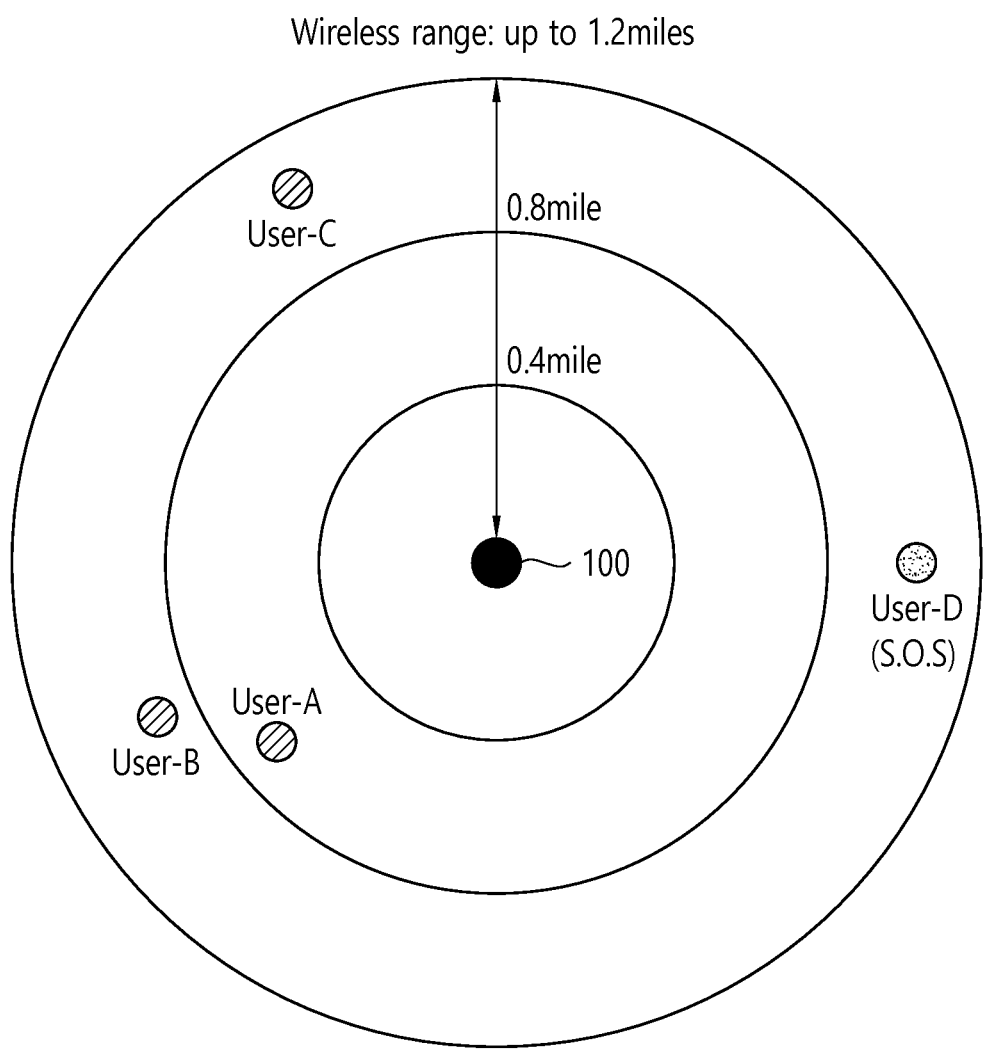
FIG. 6 is a conceptual diagram illustrating an emergency rescue operation when a wireless communication module is not connected to an external Internet.

FIG. 6 is a conceptual diagram illustrating an emergency rescue operation when a wireless communication module is not connected to an external Internet.

Referring to FIG. 6, when the wireless communication module 110 in the P-ESS 100 is not connected to an external Internet, the wireless communication module 110 may collect location information of a plurality of user terminals (Users A, B, C, D) located within the local wireless network and provide the collected location information to each of the plurality of user terminals within the local wireless network. Then, when a rescue signal is received from at least one user terminal (for example, User D) from among the plurality of user terminals (User A, B, C, and D) within the local wireless network, the wireless communication module 110 in the P-ESS 100 may transmit location information of the at least one user terminal (for example, User D), which has transmitted the rescue signal, to the plurality of user terminals at a predetermined time interval. In this case, the wireless communication module 110 may be implemented to repeatedly transmit the rescue signal at a time interval shorter than the predetermined time interval to a user terminal closest to the at least one user terminal (for example, User D) which has transmitted the rescue signal. In addition, the wireless communication module 110 may also transmit in real time location information of the closest user terminal to the at least one user terminal (for example, User D) which has transmitted the rescue signal. After a user of a user terminal which has checked the location information among the plurality of user terminals (User A, B, C, and D) within the local wireless network rescues a user of the at least one user terminal (for example, User D) which has transmitted the rescue signal, an emergency SOS operation may be terminated.

Figure 7:
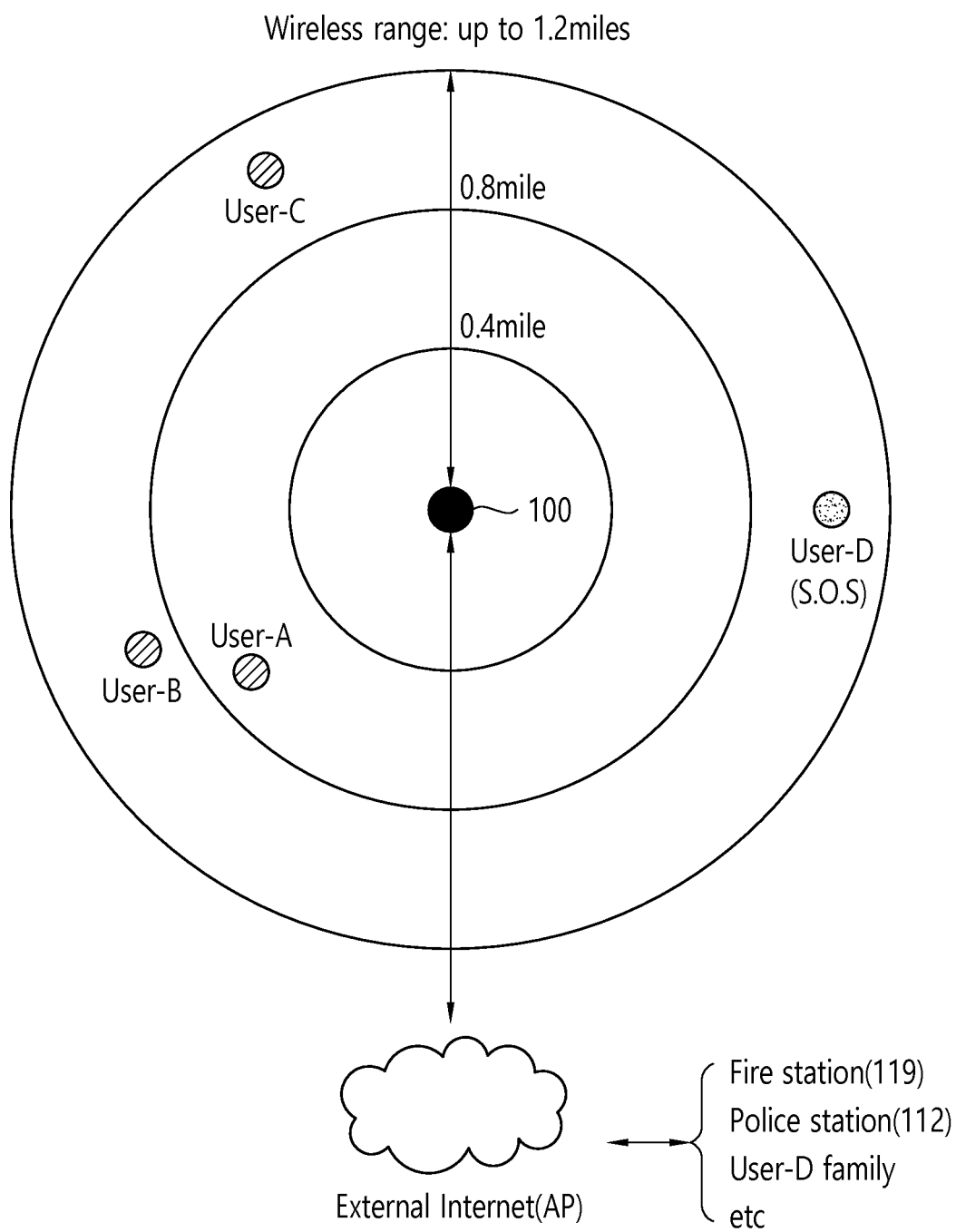
FIG. 7 is a conceptual diagram illustrating an emergency rescue operation when a wireless communication module is connected to the external Internet.

FIG. 7 is a conceptual diagram illustrating an emergency rescue operation when a wireless communication module is connected to the external Internet.

Referring to FIG. 7, when the wireless communication module 110 in the P-ESS 100 is connected to an external Internet, the wireless communication module 110 may collect location information of a plurality of user terminals (User A, B, C, and D) within the local wireless network and may provide the collected location information to each user terminal within the local wireless network. When a rescue signal is received from at least one user terminal (for example, User D) from among the plurality of user terminals within the local wireless network, the wireless communication module 110 may transmit location information of the at least one user terminal (for example, User D), which has transmitted the rescue signal, to the plurality of user terminals located within the wireless network and may transmit an SOS request through the external internet to a fire station, a police station, and the like or transmit the SOS request to a preset emergency phone number (each user's family or the like). At this time, the wireless communication module 110 may be implemented to transmit the rescue signal at a time interval shorter than a predetermined time interval to a user terminal closest to the at least one user terminal (for example, User D) which has transmitted the rescue signal. In addition, the wireless communication module 110 may also transmit in real time location information of the closest user terminal to the at least one user terminal (for example, User D) which has transmitted the rescue signal. In the case of an emergency rescue request, the wireless communication module 110 may transmit, through the external Internet, location information of the at least one user terminal (for example, User D) which has transmitted the rescue signal. After the location information is checked and a user (For example, User D) who has sent the rescue signal, the emergency SOS operation may be terminated.

As described above, according to the P-ESS 100 and the wireless communication-based rescue system proposed in the present disclosure, since the wireless communication module 110 for forming a local wireless network is mounted in the P-ESS 100, terminals within the local wireless network formed by the wireless communication module 110 are allowed to communicate with each other wirelessly even in an area or situation where communication is disabled, so that the terminals within the local wireless network can check each user's safety or location.

In addition, according to the present disclosure, as the mobile terminal 200 with the application program 210 installed therein to monitoring the P-ESS 100 and the wireless communication module 110 is further included, it is possible to remotely control the P-ESS 100 using the application program 210 installed in the mobile terminal 200. In addition, by transmitting a risk signal relating to an emergency or natural disaster to terminals within a local wireless network, it is possible to share information on any potential risk and to prepare for an emergency.

Although the embodiments of the present disclosure have been described, it will be understood by one of ordinary skill that various modifications can be made to the present disclosure without departing from the scope of the invention defined by the appended claims.

What is claimed is:

1. A portable energy storage system (P-ESS) comprising a wireless communication module configured to form a local wireless network, wherein the portable energy storage system is configured to provide wireless communication to terminals within the local wireless network,
   when the wireless communication module is not connected to an external Internet, the wireless communication module is configured to:
   collect location information of the terminals within the local wireless network;
   provide the collected location information to each of the terminals within the local wireless network; and
   in response to receiving a rescue signal from at least one terminal among the terminals within the local wireless network, transmit location information of a first terminal to the terminals within the local wireless network, the first terminal being a terminal transmitting the rescue signal.

2. The portable energy storage system of claim 1, wherein at least one selected from a group including a call service, a message service, a location information transmitting and receiving service, and a risk information transmitting and receiving service is provided using wireless communication between terminals within the local wireless network formed by the wireless communication module.

3. The portable energy storage system of claim 1, wherein the wireless communication module is configured to form the local wireless network when a predetermined condition is satisfied.

4. The portable energy storage system of claim 3, wherein the predetermined condition is a condition indicating restriction of a network use or a condition indicating an emergency.

5. The portable energy storage system of claim 1, wherein an application program for monitoring the portable energy storage system and the wireless communication module is installed in a mobile terminal.

6. The portable energy storage system of claim 5, wherein the mobile terminal is configured to connect an Internet of Things (IoT) sensor through the local wireless network, and collect and analyze data collected by the IoT sensor.

7. The portable energy storage system of claim 5, wherein the mobile terminal is configured to transmit a risk signal to the terminals within the local wireless network according to an analysis result.

8. The portable energy storage system of claim 7, wherein the mobile terminal is configured to:
collect real-time temperature data from a temperature sensor; and
transmit the risk signal to the terminals within the local wireless network when the collected temperature data increases above a preset maximum temperature threshold or decreases below a preset minimum temperature threshold.

9. The portable energy storage system of claim 5, wherein when the wireless communication module is connected to an external Internet, the wireless communication module is configured to:
collect location information of the terminals within the local wireless network;
provide the collected location information to each of the terminals within the local wireless network; and
in response to receiving a rescue signal from at least one terminal among the terminals within the local wireless network, transmit location information of a first terminal to the terminals within the local wireless network, the first terminal being a terminal transmitting the rescue signal, and transmit an emergency SOS request through the external internet or transmit the emergency SOS request to a preset emergency phone number.

\* \* \* \* \*